(12) United States Patent
Wang (10) Patent No.: US 10,517,022 B2
(45) Date of Patent: Dec. 24, 2019

(54) METHOD FOR ENABLING TERMINAL ACCESS TO CELL, TERMINAL AND COMPUTER STORAGE MEDIUM

(71) Applicant: GUANGDONG OPPO MOBILE TELECOMMUNICATIONS CORP., LTD., Dongguan, Guangdong (CN)

(72) Inventor: Xukang Wang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 82 days.

(21) Appl. No.: 15/807,822

(22) Filed: Nov. 9, 2017

(65) Prior Publication Data
US 2018/0227810 A1 Aug. 9, 2018

(30) Foreign Application Priority Data
Feb. 3, 2017 (CN) .......................... 2017 1 0063515

(51) Int. Cl.
*H04W 8/16* (2009.01)
*H04W 36/00* (2009.01)
(Continued)

(52) U.S. Cl.
CPC ......... *H04W 36/0061* (2013.01); *H04W 8/16* (2013.01); *H04W 36/0022* (2013.01); *H04W 48/10* (2013.01); *H04W 48/16* (2013.01)

(58) Field of Classification Search
CPC .......... H04W 4/02; H04W 8/12; H04W 8/16; H04W 16/32; H04W 36/0022;
(Continued)

(56) References Cited

U.S. PATENT DOCUMENTS 7,941,144 B2 * 5/2011 Nylander ............... H04W 12/08
455/435.1
8,265,685 B2 * 9/2012 Vikberg ............... H04J 11/0093
455/410
(Continued)

FOREIGN PATENT DOCUMENTS

CN 101288333 A 10/2008
CN 103716774 A 4/2014
(Continued)

OTHER PUBLICATIONS

International Search Report in international application No. PCT/CN2017/101629, dated Nov. 30, 2017.
(Continued)

*Primary Examiner* — Alpus Hsu
(74) *Attorney, Agent, or Firm* — Ladas & Parry LLP (57) ABSTRACT

Disclosed are a method for enabling a terminal access to a cell, a terminal and a storage medium. The method includes: when performing a Circuit Switched Domain Fallback (CSFB) service, a terminal sends a location update request to a base station of a first cell; when receiving a location update reject message, which is returned by the base station of the first cell in response to the location update request, and determining that a reason for reject is Location Area Not Allowed according to the location update reject message, the terminal puts a Location Area Identification (LAI) of the first cell into a forbidden location areas (LAs) for roaming list; and in response to putting the LAI of the first cell into the forbidden LAs for roaming list, the terminal searches one or more second cells except the first cell and performs an access operation.

12 Claims, 6 Drawing Sheets

(51) Int. Cl.
*H04W 48/10* (2009.01)
*H04W 48/16* (2009.01)

(58) Field of Classification Search
CPC ......... H04W 36/0055; H04W 36/0061; H04W 36/14; H04W 48/02; H04W 48/10; H04W 48/16; H04W 64/00
See application file for complete search history.

(56) References Cited

U.S. PATENT DOCUMENTS

| | | | |
|---|---|---|---|
| 8,682,322 B2* | 3/2014 | Wallis | H04W 36/0022 455/435.1 |
| 8,874,120 B1* | 10/2014 | Tian | H04W 8/12 455/445 |
| 9,072,030 B2* | 6/2015 | Juuti | H04W 48/02 |
| 9,271,316 B2* | 2/2016 | Bakker | H04W 76/11 |
| 9,294,967 B2* | 3/2016 | Sridhar | H04W 36/0022 |
| 9,332,460 B2* | 5/2016 | Lee | H04W 36/00 |
| 9,420,556 B2* | 8/2016 | Mahmood | H04W 48/18 |
| 9,565,598 B2* | 2/2017 | Devarayanigari | H04W 36/0022 |
| 9,591,471 B2* | 3/2017 | Liu | H04W 8/06 |
| 9,681,480 B2* | 6/2017 | Adjakple | H04W 76/15 |
| 9,713,053 B2* | 7/2017 | Jiang | H04W 60/04 |
| 9,794,832 B2* | 10/2017 | Yan | H04W 36/0022 |
| 9,973,978 B2* | 5/2018 | Mahmood | H04W 36/14 |
| 10,004,003 B2* | 6/2018 | Wallis | H04W 36/0022 |
| 10,028,174 B2* | 7/2018 | Jiang | H04W 8/12 |
| 10,187,764 B2* | 1/2019 | Modiano | G06Q 20/16 |
| 10,200,852 B1* | 2/2019 | Datar | H04W 8/06 |
| 10,225,778 B2* | 3/2019 | Yu | H04W 48/18 |
| 10,356,668 B2* | 7/2019 | Ranke | H04W 36/0022 |
| 2007/0037577 A1 | 2/2007 | Dalsgaard | |
| 2007/0202886 A1* | 8/2007 | Dhebri | H04W 4/02 455/456.1 |
| 2010/0075658 A1 | 3/2010 | Hou | |
| 2011/0299682 A1* | 12/2011 | Hallenstal | H04L 63/061 380/247 |
| 2013/0210466 A1* | 8/2013 | Arvidsson | H04W 4/025 455/458 |
| 2013/0308527 A1 | 11/2013 | Chin | |
| 2014/0051443 A1* | 2/2014 | Diachina | H04W 36/0022 455/436 |
| 2015/0003328 A1* | 1/2015 | Gemski | H04W 4/025 370/328 |
| 2015/0296420 A1* | 10/2015 | Drevon | H04W 36/0022 455/436 |
| 2016/0183156 A1 | 6/2016 | Chin et al. | |
| 2016/0277991 A1 | 9/2016 | Yang et al. | |
| 2017/0048758 A1* | 2/2017 | Shu | H04W 8/06 |
| 2017/0257800 A1* | 9/2017 | Lee | H04W 76/18 |

FOREIGN PATENT DOCUMENTS

| | | |
|---|---|---|
| CN | 104883713 A | 9/2015 |
| CN | 106105314 A | 11/2016 |
| CN | 106878975 A | 6/2017 |
| EP | 3108690 A1 | 12/2016 |

OTHER PUBLICATIONS

English Translation of the Written Opinion of the International Search Authority in international application No. PCT/CN2017/101629, dated Nov. 30, 2017.

Supplementary European Search Report in European application No. 17191075.5, dated Dec. 19, 2017.

"Digital cellular telecommunications system(Phase 2+)(GSM); Universal Mobile Telecommunications System(UMTS); LTE; Non-Access-Stratum (NAS) functions related to Mobile Station (MS) in idle mode (3GPP TS 23.122 version 13.6.0 Release 13)", ETSI Technical Specification, European Telecommunications Standards Institute (ETSI), 650, Route Des Lucioles; F-06921 Sophia-Antipolis; France, vol. 3GPP CT, No. V13.6.0, Oct. 6, 2016(Oct. 6, 2016), pp. 1-52, XP014279951.

"Digital cellular telecommunications system(Phase 2+)(GSM); Universal Mobile Telecommunications System(UMTS); LTE; Mobile radio interface Layer 3 specification; Core network protocols; Stage 3 (3GPP TS 24.008 version 13.8.0 Release 13)", ETSI Technical Specification, European Telecommunications Standards Institute (ETSI), 650, Route Des Lucioles; F-06921 Sophia-Antipolis; France, vol. 3GPP CT, No. V13.8.0, Jan. 13, 2017(Jan. 13, 2017), pp. 1-781, XP014287601.

* cited by examiner

METHOD FOR ENABLING TERMINAL ACCESS TO CELL, TERMINAL AND COMPUTER STORAGE MEDIUM

CROSS-REFERENCE TO RELATED APPLICATIONS

This application is filed based upon and claims priority to Chinese Patent Application No. 201710063515.X, entitled "Method for Enabling Terminal Access to Cell and Device", filed on Feb. 3, 2017, the entire contents of which are incorporated herein by reference.

TECHNICAL FIELD

The disclosure relates to the field of communications, and in particular, to a method for enabling a terminal access to a cell, a terminal and a computer storage medium.

BACKGROUND in modern society, in a high-speed 4G network, a voice solution mainly includes a Circuit Switched Domain Fallback (CSFB) solution, which mainly falls back to a Global System for Mobile Communications (GSM) or a Wideband Code Division Multiple Access (WCDMA) network to support a Circuit Switched (CS) service. However, a mobile terminal cannot register on a network in a call process or is out of service, thus bringing a poor experience for a user.

SUMMARY

According to at least some of embodiments of the present disclosure, there is provided a method for enabling a terminal access to a cell, terminal, and computer storage medium, thereby improving the use experience during the use of a terminal.

According to a first aspect of the disclosure, a method for enabling a terminal access to a cell is provided. The method includes: when performing a CSFB service, a terminal sends a location update request to a base station of a first cell; when receiving a location update (lu) reject message, which is returned by the base station of the first cell in response to the location update request and determining that a reason for reject is Location Area Not Allowed according to the lu reject message, the terminal puts a Location Area Identification (LAI) of the first cell into a forbidden LAs for roaming list; and in response to putting the LAI of the first cell into the forbidden LAs for roaming list, the terminal searches one or more second cells except the first cell and performs an access operation.

According to a second aspect of the disclosure, a terminal is provided. The terminal includes: a sending unit, configured to send, when performing a CSFB service, a location update request to a base station of a first cell; a receiving unit, configured to receive an lu reject message, which is returned by the base station of the first cell in response to the location update request; a processing unit, configured to put, when determining that a reason for reject is Location Area Not Allowed according to the lu reject message, an LAI of the first cell into a forbidden LAs for roaming list; and a search unit, configured to search, in response to putting the LAI of the first cell into the forbidden LAs for roaming list, one or more second cells except the first cell, and perform an access operation.

According to a third aspect of the disclosure, a terminal is provided. The terminal includes: a processor; and a memory, configured to store instructions that are executable by the processor. The processor is configured to: send, when performing a CSFB service, a location update request to a base station of a first cell; receive a location update reject message, which is returned by the base station of the first cell in response to the location update request; put, when determining that a reason for reject is Location Area Not Allowed according to the location update reject message, an LAI of the first cell into a forbidden LAs for roaming list; and search, in response to putting the LAI of the first cell into the forbidden LAs for roaming list one or more second cells except the first cell, and performing an access operation.

A person of ordinary skill in the art will know that though the following detailed description will be made with reference to illustrative embodiments and accompanying drawings, the disclosure is not limited to these embodiments. Instead, the scope of the disclosure is wide, and intended to be defined only by the appended claims.

BRIEF DESCRIPTION OF DRAWINGS

Other features, purposes and advantages of the disclosure will become more apparent by reading the detailed description made on nonrestrictive embodiments with reference to the following drawings.

DETAILED DESCRIPTION

Before exemplary embodiments are discussed in more detail, it is to be noted that some exemplary embodiments are described as processes or methods illustrated in the flowchart. Although the flowchart describes various operations as a sequence process, many operations in the flowchart may be implemented in parallel, concurrently or simultaneously. In addition, the sequence of the various operations may be re-arranged. When the operation is completed, the process may be ended, but additional steps not included in the drawings may also be provided. The process may correspond to a method, a function, a regulation, a sub-routine, a sub-program and the like.

'Computer equipment' referred to in context is also referred to as a 'computer', which means smart electronic equipment that can execute a predetermined process such as numerical calculation and/or logic calculation by running a predetermined program or instruction. The computer equipment may include a processor and a memory. The processor may execute an existence instructions pre-stored in the memory to execute the predetermined process, or hardware such as an Application Specific Integrated Circuit (ASIC), a Field Programmable Gate Array (FPGA) and a Digital Signal Processor (DSP) executes the predetermined process, or a combination of the processor and the hardware implements the predetermined process. The computer equipment includes, but is not limited to, a server, a personal computer, a laptop, a tablet, a smart phone and the like.

Methods (some of them are illustrated in a flowchart) discussed hereinafter may be implemented by hardware, software, firmware, middleware, micro-codes, hardware description languages or any combination thereof. When the methods are implemented by using the software, the firmware, the middleware or the micro-codes, program codes or code segments used to implement a necessary task may be stored in a machine-readable or a computer-readable medium (such as a storage medium). One or more processors may implement the necessary task.

Specific structures and functional details disclosed herein are merely representative, and are for purpose of describing the exemplary embodiments of the disclosure. However, the disclosure can be specifically implemented in many alternative forms, and is not to be interpreted as being limited by the embodiments elaborated herein.

It is to be understood that although terms 'first', 'second' and the like may be used herein to describe various units, these units are not to be limited by these terms. These terms are used to merely distinguish one unit from another unit. For example, a first unit may be referred to as a second unit, and similarly, the second unit may be referred to as the first unit, without departing from the scope of the exemplary embodiments. Terms 'and/or' used herein include any or all combinations of one or more of the listed associated items.

The terms used herein are only intended to describe specific embodiments, and are not intended to limit the exemplary embodiments. Unless otherwise specified in the context, singular form 'a' or 'one' is intended to include plural form. Besides, it is to be understood that terms 'include', "comprise" and/or 'contain' used herein specify the existence of the stated features, integers, steps, operations, units and/or components without exclusion: of the existence or addition of one or more other features, integers, steps, operations, units, components and/or combinations thereof.

It is also to be noted that in some replaced implementations, the mentioned functions/actions may occur in an order different from an order illustrated in the drawings. For example, depending on the involved functions/actions, two diagrams successively illustrated may be actually executed substantially at the same time or may be executed in a reverse order sometimes.

According to at least some of embodiments of the present disclosure, there is provided a method for enabling a terminal access to a cell, terminal, and computer storage medium, thereby improving the use experience during the use of a terminal.

According to some embodiments of the disclosure, a method for enabling a terminal access to a cell is provided. The method includes: when performing a CSFB service, a terminal sends a location update request to a base station of a first cell; when receiving a location update (lu) reject message, which is returned by the base station of the first cell in response to the location update request and determining that a reason for reject is Location Area Not Allowed according to the lu reject message, the terminal puts a Location Area Identification (LAI) of the first cell into a forbidden LAs for roaming list; and in response to putting the LAI of the first cell into the forbidden LAs for roaming list, the terminal searches one or more second cells except the first cell and performs an access operation.

In some embodiments, the operation that the terminal searches one or more second cells except the first cell and performs an access operation may include: the terminal sets a time period during which the LAI of the first cell is held in the forbidden LAs for roaming list, and the terminal searches one or more second cells except the first cell and performs an access operation within the time period.

In some embodiments, the method may further include: after the time period, the terminal deletes the first cell from the forbidden LAs for roaming list.

In some embodiments, the method may further include: the terminal carries the LAI of the first cell in a broadcast message for broadcasting, the broadcast message including an indication identifier for indicating that the first cell has been held in the forbidden LAs for roaming list.

In some embodiments, the terminal may carry the indication identifier in a field of a head of the broadcast message.

According to some embodiments of the disclosure, a terminal is provided. The terminal includes: a sending unit, configured to send, when performing a CSFB service, a location update request to a base station of a first cell; a receiving unit, configured to receive an lu reject message, which is returned by the base station of the first cell in response to the location update request; a processing unit, configured to put, when determining that a reason for reject is Location Area Not Allowed according to the lu reject message, an LAI of the first cell into a forbidden LAs for roaming list; and a search unit, configured to search, in response to putting the LAI of the first cell into the forbidden LAs for roaming list, one or more second cells except the first cell, and perform an access operation.

In some embodiments, the terminal may further include: a setting unit, configured to set a time period during which the LAI of the first cell is held in the forbidden LAs for roaming list. In this case, the search unit may be configured to search one or more second cells except the first cell and perform an access operation within the time period.

In some embodiments, the terminal may further include: a deleting unit, configured to delete, after the time period, the LAI of the first cell from the forbidden LAs for roaming list.

In some embodiments, the sending unit may be further configured to carry the LAI of the first cell in a broadcast message for broadcasting, the broadcast message including an indication identifier for indicating that the first cell is held in the forbidden LAs for roaming list.

In some embodiments, the processing unit may be further configured to carry the indication identifier in a field of a head of the broadcast message.

According to some embodiments of the disclosure, a terminal is provided. The terminal includes: a processor; and a memory, configured to store instructions that are executable by the processor. The processor is configured to: send, when performing a CSFB service, a location update request to a base station of a first cell; receive a location update reject message, which is returned by the base station of the first cell in response to the location update request; put, when determining that a reason for reject is Location Area Not Allowed according to the location update reject message, an LAI of the first cell into a forbidden LAs for roaming list; and search, in response to putting the LAI of the first cell into the forbidden LAs for roaming list, one or more second cells except the first cell, and performing an access operation.

According to some embodiments, the processor may be further configured to: set a time period during which the LAI of the first cell is held in the forbidden LAs for roaming list;

and search one or more second cells except the first cell and execute the access operation within the time period.

According to some embodiments, the processor may be further configured to: delete, after the lime period, the first cell from the forbidden LAs for roaming list.

According to some embodiments, the processor may be further configured to carry the LAI of the first cell in a broadcast message for broadcasting, the broadcast message including an indication identifier for indicating that the first cell is held in the forbidden LAs for roaming list.

According to some embodiments, the processor may be further configured to: carry the indication identifier in a field of a head of the broadcast message.

According to some embodiments of the disclosure, a non-transitory computer readable storage medium is provided. The non-transitory computer-readable storage medium has stored thereon instructions that, when executed by a processor, cause the processor execute the aforementioned method for enabling a terminal access to a cell.

A person of ordinary skill in the art will know that though the following detailed description will be made with reference to illustrative embodiments and accompanying drawings, the disclosure is not limited to these embodiments. Instead, the scope of the disclosure is wide, and intended to be defined only by the appended claims.

The disclosure will be described in detail below with reference to the drawings.

Figure 1:
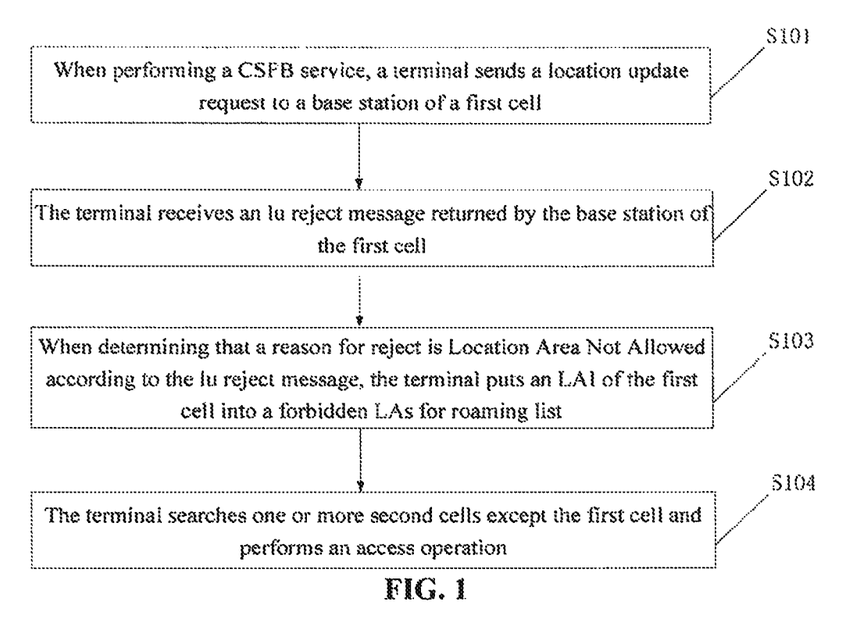
FIG. 1 is a flowchart illustrating a method for enabling a terminal access to a cell according to a preferable embodiment of the disclosure.

According to one aspect of the disclosure, a method for enabling a terminal access to a cell is provided. The method may be implemented by a smart terminal. The smart terminal may specifically be smart equipment such as a mobile phone, a tablet, a smart watch, a smart wristband, a personal digital assistant, a personal computer or a server. As illustrated in FIG. 1, the method includes operations at blocks S101-S103 as illustrated in FIG. 1.

At block S101, when implementing a CSFB service, a terminal sends a location update request to a base station of a first cell.

For example, when a user makes a call in a 4G network, it is needed to fall back to a GSM network to make a CS service. In the process of failing back to the GSM network, the terminal sends the location update request.

A CSFB technology is applied to a scenario of overlapped coverage of a 2G/3G circuit domain and a TD-LTE wireless network. The network layout of the CSFB technology is simple. It is unnecessary to deploy an IMS system in the CSFB technology. The existing CS network investment can be effectively utilized in the CSFB technology. A Single Radio Voice Call Continuity (SRVCC) technology is applied to a scenario where an operator has deployed the IP Multimedia Subsystem (IMS) system and a Time Division Long Term Evolution (TD-LTE) network is able to provide an IMS-based voice service but the TD-LTE network cannot achieve whole-network coverage. A TD-LTE/Time Division-Synchronous Code Division (TD-SCDMA)/GSM (GPRS) multi-mode dual-standby terminal may select a TD-SCDMA/GSM mode to establish a voice service.

At block S102, the terminal receives a location update reject (i.e., lu reject) message returned by the base station of the first cell.

At the block S103, when determining that a reason for the reject is Location Area Not Allowed (12) according to the lu reject message, the terminal puts an LAI of the first cell into a forbidden LAs for roaming list.

At the block S104, the terminal searches one or more second cells except the first cell and performs an access operation.

For the operation for accessing a cell, please refer to relevant regulations of a Long Term Evolution (LTE), and the operation for accessing a cell will not be elaborated herein.

According to some related arts, in a process that the terminal registers to a 2G cell, according to regulations of relevant protocols, it is judged whether a cell is an appropriate cell according to whether the LAI of the cell is in the forbidden LAs for roaming list. When the LAI of a cell is not in the forbidden LAs for roaming list, a 2G cell registration can be initiated to the cell. However, when the terminal sends a location update request to a cell in a process of falling back to the GSM and the cell sends a location update reject message to the terminal in response to the location update request and the reason for reject is Location Area Not Allowed (12), the terminal will add the LAI of the cell into a forbidden location areas for regional provision of service list. In this case, the LAI of the cell is not in the forbidden LAs for roaming list but is in the forbidden location areas for regional provision of service list, which results in that the terminal successfully resides in a 2G cell but a Mobile Management (MM) judges that a limit service situation occurs currently in case of limit service, the terminal cannot successfully register with a current cell, thus resulting in that the terminal is in an out-of-service state. This will make a user feel confused and have a bad experience.

However, according to this embodiment, when the lu reject message returned by the base station of the first cell is received, the terminal adds the LAI of the first cell into the forbidden LAs for roaming list. The first cell has been forbidden for access at this time. Thus, the terminal (such as a mobile phone) will register with a network only on other normal cells, and accordingly the terminal can normally register with the network and can make a normal call and surf the internet through data. Such solution can bring a better network usage experience to a user, and also can prevent the user from returning the mobile phone.

Figure 2:
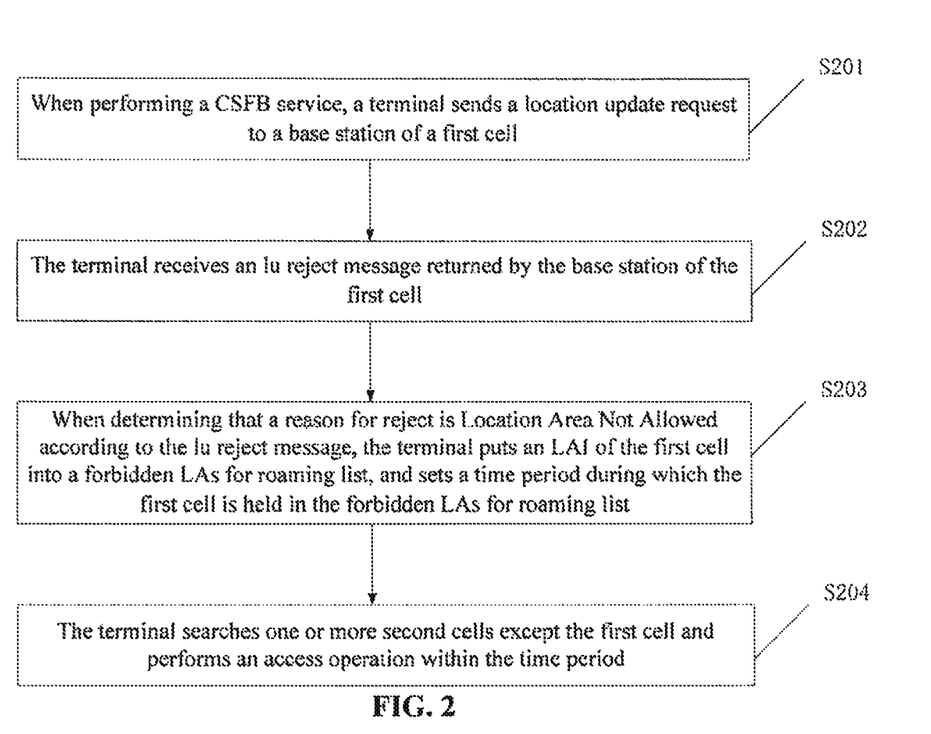
FIG. 2 is a flowchart illustrating a method for enabling a terminal access to a cell according to another preferable embodiment of the disclosure.

According to some embodiments, a method for enabling a terminal access to a cell is provided. The method may be implemented by a smart terminal. The smart terminal may be for example smart equipment, such as a mobile phone, a tablet, a smart watch, a smart wristband, a personal digital assistant, a personal computer or a server. As illustrated in FIG. 2, the method includes operations at blocks S201-S204.

At the block S201, when performing a CSFB service, a terminal sends a location update request to a base station of a first cell.

A CSFB technology is applied to a scenario of overlapped coverage of a 2G/3G circuit domain and a TD-LTE wireless network. The network layout of the CSFB technology is simple. It is unnecessary to deploy an IMS system in the CSFB technology. The existing CS network investment can be effectively utilized in the CSFB technology. An SRVCC technology is applied to a scenario where an operator has deployed the IMS system and a TD-LTE network is able to provide an IMS-based voice service but the TD-LTE network cannot achieve whole-network coverage. A TD-LTE/TD-SCDMA/GSM (GPRS) multi-mode dual-standby terminal may select a ID-SCDMA/GSM mode to establish a voice service.

At the block S202, the terminal receives an lu reject (location update reject) message returned by the base station of the first cell.

At the block S203, when determining that a reason for reject is Location Area Not Allowed (12) according to the lu reject message, the terminal puts an LAI of the first cell into a forbidden LAs for roaming list and sets a time period A during which the first cell is held in the forbidden LAs for roaming list.

At the block S204, the terminal searches one or more second cells except the first cell and performs an access operation within the time period A.

For the operation for accessing a cell, please refer to relevant regulations of LTE, and the operation for accessing a cell will not be elaborated herein.

According to this embodiment, when the Iu reject message returned by the base station of the first cell is received, the terminal adds the LAI of the first cell into the forbidden LAs for roaming list. The first cell has been forbidden for access at this time. Thus, a terminal (e.g. a mobile phone) will register with a network only on other normal cells, and accordingly the terminal can normally register with the network and can make a normal call and surf the internet through data. Such solution can bring a better network usage experience to a user, and also can prevent the user from returning the mobile phone.

Figure 3:
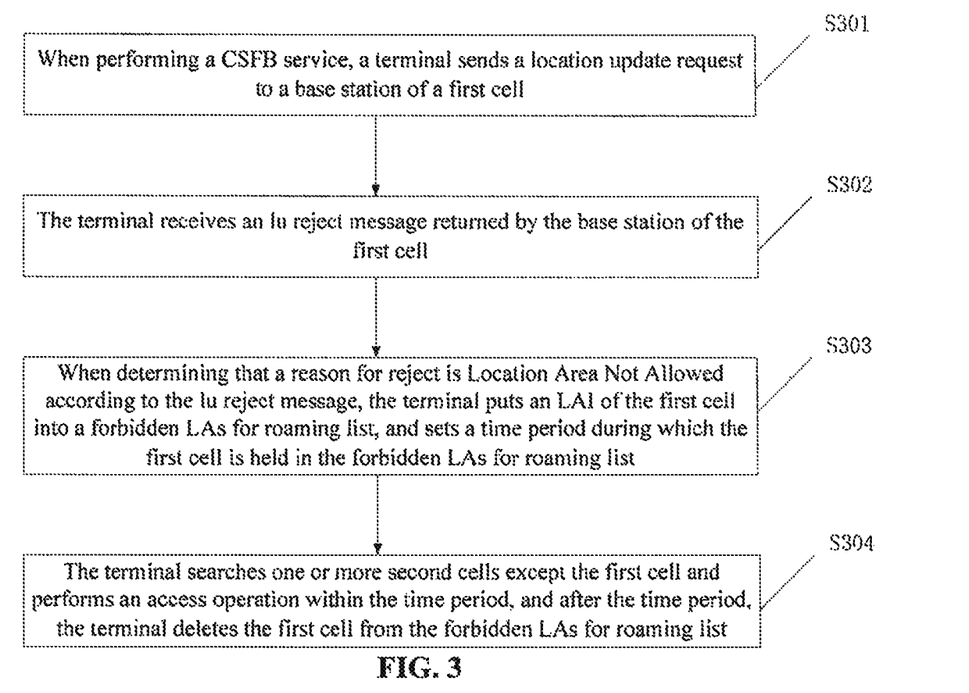
FIG. 3 is a flowchart illustrating a method for enabling a terminal access to a cell according to yet another preferable embodiment of the disclosure.

According to another embodiment of the disclosure, a method for enabling a terminal access to a cell is provided. The method may be implemented by a smart terminal. The smart terminal may be for example smart equipment, such as a mobile phone, a tablet, a smart watch, a smart wristband, a personal digital assistant, a personal computer or a server. As illustrated in FIG. 3, the method includes operations at blocks S301-S304.

At the block S301, when performing a CSFB service, a terminal sends a location update request to a base station of a first cell.

A CSFB technology is applied to a scenario of overlapped coverage of a 2G/3G circuit domain and a TD-LTE wireless network. The network layout of the CSFB technology is simple, it is unnecessary to deploy an IMS system in the CSFB technology. The existing CS network investment can be effectively utilized in the CSFB technology. An SRVCC technology is applied to a scenario where an operator has deployed the IMS system and a TD-LTE network is able to provide an IMS-based voice service but the TD-LTE network cannot achieve whole-network coverage. A TB-LTE/TD-SCDMA/GSM (GPRS) multi-mode dual-standby terminal may select a TD-SCDMA/GSM mode to establish a voice service.

At the block S302, the terminal receives an Iu reject (location update reject) message returned by the base station of the first cell.

At the block S303, when determining that a reason for reject is Location Area Not Allowed (12) according to the Iu reject message, the terminal puts an LAI of the first cell into a forbidden LAs for roaming list, and sets a time period A during which the first cell is held in the forbidden LAs for roaming list.

At the block S304, the terminal, searches one or more second cells except the first cell within the time period A and performs an access operation, and after the time period A, the terminal deletes the first cell from the forbidden LAs for roaming list.

For the operation for accessing a cell, please refer to relevant regulations of LTE, and the operation for accessing a cell will not be elaborated herein.

According to this embodiment, when the Iu reject message returned by the base station of the first cell is received, the terminal adds the LAI of the first cell into the forbidden LAs for roaming list. The first cell has been forbidden for access at this time. Thus, a terminal (e.g. a mobile phone) will register with a network only on other normal cells, and accordingly the mobile phone can normally register with the network and can make a normal call and surf the internet through data. In addition, according to this embodiment, a time period A is also set. After the time period A, access to the first cell can be normally performed. Thus, it can avoid idling of the first cell and occupancy of network resource due to access to the first cell is forbidden for a long time. Such solution can bring a better network usage experience to a user, and also can prevent the user from returning the mobile phone.

Figure 4:
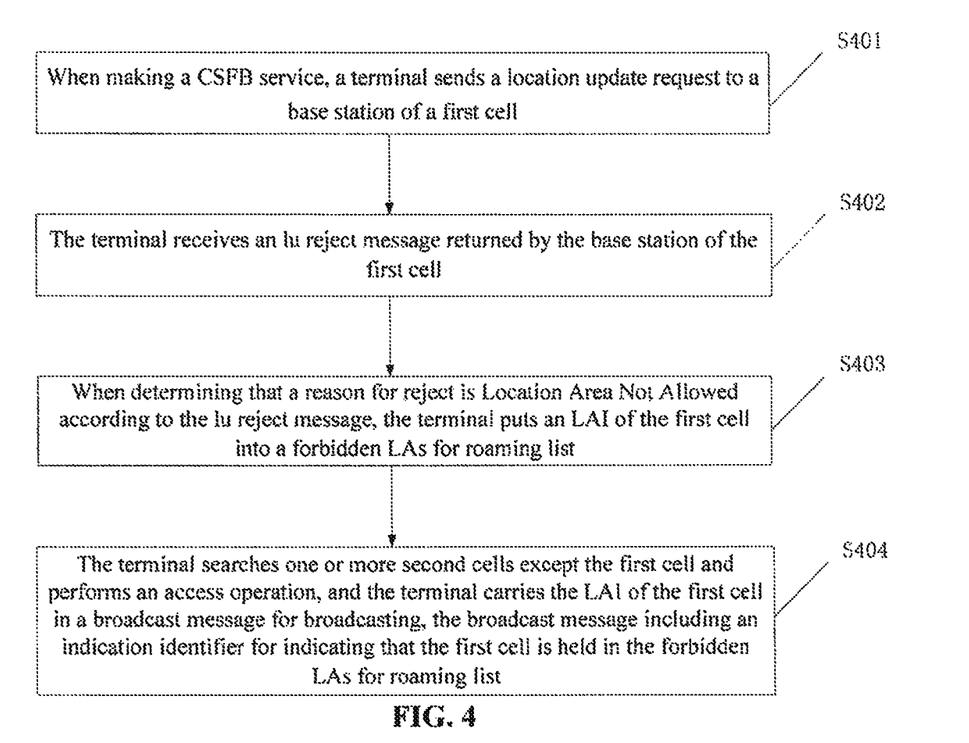
FIG. 4 is a flowchart illustrating a method for enabling a terminal access to a cell according to still yet another preferable embodiment of the disclosure.

According to a further embodiment of the disclosure, a method for enabling a terminal access to a cell is provided. The method may be implemented by a smart terminal. The smart terminal may be for example smart equipment, such as a mobile phone, a tablet, a smart watch, a smart wristband, a personal digital assistant, a personal computer or a server. As illustrated in FIG. 4, the method includes operations at blocks S401-S404.

At the block S401, when performing a CSFB service, a terminal sends a location update request to a base station of a first cell.

A CSFB technology is applied to a scenario of overlapped coverage of a 2G/3G circuit domain and a TD-LTE wireless network. The network layout of the CSFB technology is simple, it is unnecessary to deploy an IMS system in the CSFB technology. The existing CS network investment can be effectively utilized in the CSFB technology. An SRVCC technology is applied to a scenario where an operator has deployed the IMS system and a TD-LTE network is able to provide an IMS-based voice service but the TD-LTE network cannot achieve whole-network coverage. A TD-LTE/TD-SCDMA/GSM (GPRS) multi-mode dual-standby terminal may select a TD-SCDMA/GSM mode to establish a voice service.

At the block S402, the terminal receives an Iu reject (location update reject) message returned by the base station of the first cell.

At the block S403, when determining that a reason for reject is Location Area Not Allowed (12) according to the Iu reject message, the terminal puts an LAI of the first cell into a forbidden LAs for roaming list.

At the block S404, the terminal searches one or more second cells except the first cell and performs an access operation, and the terminal carries the LAI of the first cell in a broadcast message for broadcasting. The broadcast message may include an indication identifier for indicating that the LAI of the first cell is held in the forbidden LAs for roaming list.

For the operation for accessing a cell, please refer to relevant regulations of LTE, and the operation for accessing a cell will not be elaborated herein. The indication identifier may be implemented in many manners. For example, the indication identifier may be implemented by using a special field (such as 10 successive "1"). The indication identifier may also be implemented in other manners certainly. For example, the indication identifier is represented by selecting a certain number of bits (such as 1 bit) in a field of a head of the broadcast message.

According to this embodiment, when the Iu reject message returned by the base station of the first cell is received, the terminal adds the LAI of the first cell into the forbidden LAs for roaming list. The first cell has been forbidden for access at this time. Thus, a terminal (e.g. mobile phone) will register with a network only on other normal cells, and accordingly the terminal can normally register with the network and can make a normal call and surf the internet through data. In addition, according to this embodiment, a broadcast message is used to indicate that the first cell has been put into the forbidden LAs for roaming list. Thus, other terminals may be prevented from falsely entering the first cell, thus improving the success rate of a terminal accessing to a cell. Such solution can bring a better network usage experience to a user, and also can prevent the user from returning the mobile phone.

Figure 5:
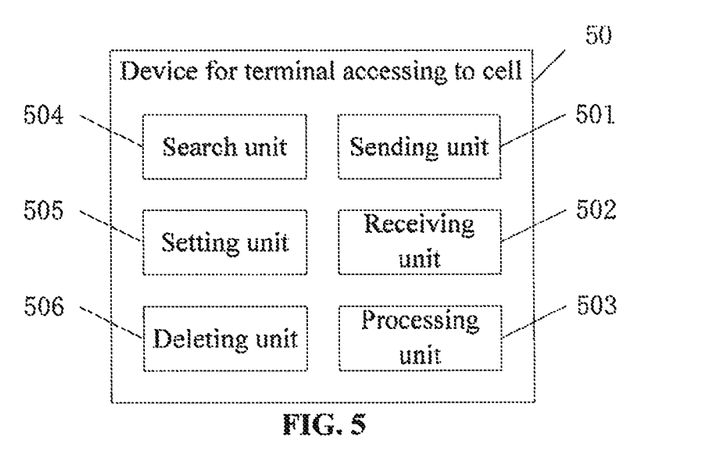
FIG. 5 is a block diagram illustrating a device for enabling a terminal access to a cell according to another preferable embodiment of the disclosure.

FIG. 5 illustrates a device 50 for enabling a terminal access to a cell. The device includes a sending unit 501, a receiving unit 502, a processing unit 503 and a search unit 504.

The sending unit 501 is configured to send, when performing a CSFB service, a location update request to a base station of a first cell.

The receiving unit 502 is configured to receive an Iu reject message returned by the base station of the first cell.

The processing unit 503 is configured to put, when determining that a reason for reject is Location Area Not Allowed according to the Iu reject message, an LAI of the first cell into a forbidden LAs for roaming list.

The search unit 504 is configured to search one or more second cells except the first cell, and perform an access operation.

Alternatively, the device 50 may further include a setting unit 505.

The setting unit 505 may be configured to set a time period A during which the first cell is held in the forbidden LAs for roaming list.

When the setting unit 505 is configured to set a time period A during which the first cell is held in the forbidden LAs for roaming list the search unit 504 may be configured to search one or more second cells except the first cell and perform an access operation within the time period A.

Optionally, the device 50 may further include a deleting unit 506.

The deleting unit 506 may be configured to enable, after the time period, the terminal to delete the first cell from the forbidden LAs for roaming list.

In one embodiment, the sending unit 501 may be further configured to carry the LAI of the first cell in a broadcast message for broadcasting. The broadcast message may include an indication identifier for indicating to put the first cell into the forbidden LAs for roaming list.

In one embodiment, the processing unit 503 may be further configured to carry the indication identifier in a field of a head of the broadcast message.

Without departing from the spirit or essential features of the disclosure, details of the embodiments of the disclosure can be implemented in other specific forms. Therefore, from any perspective, the embodiments shall be regarded to be exemplary and nonrestrictive. The scope of the disclosure is limited by the appended claims instead of the above description. Thus, it is intended to cover all changes falling within the meaning and scope of equivalent elements of the claims into the disclosure. Any reference signs in the claims should not be construed as limits to the involved claims. In addition, apparently, a word 'include', 'comprise' or 'contain' does not exclude other units or steps, and a singular form does not exclude a plural form. Multiple units or devices stated in the system claims may also be implemented, by one unit or device through software or hardware. First, Second and other words are used to represent names, and do not represent any specific order.

The flowcharts and the block diagrams in the drawings show architectures, functions and operations which may be implemented in systems, methods and computer program products according to many embodiments of the disclosure. In view of this, each block in the flowcharts or block diagrams may represent part of a module, a program segment or a code, the part of the module, the program segment or the code contains one or more executable instructions for implementing specified logic functions. It is also to be noted that in some alternative implementations, functions marked at the blocks may also be implemented in an order different from an order marked in the drawings. For example, two successive blocks may be executed substantially in parallel in practice, and they may be executed in a reverse order sometimes, which depends on the involved functions. It is also to be noted that each block at the block diagrams and/or flowcharts and the combination of the blocks at the block diagrams and/or flowcharts may be implemented by using a dedicated hardware-based system for performing specified functions or actions, or may be implemented by using the combination of dedicated hardware and computer instructions.

Figure 6:
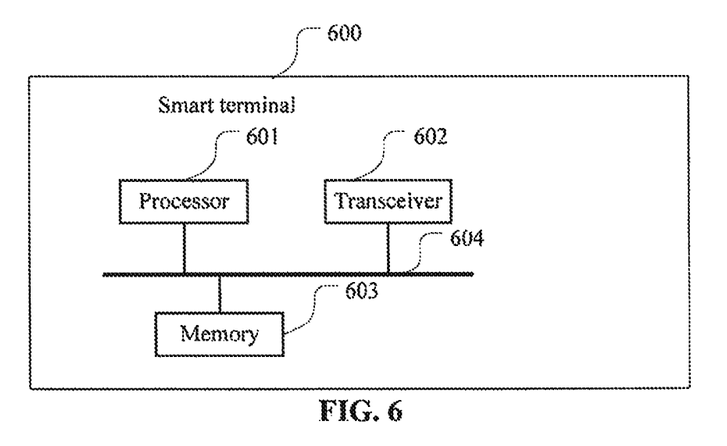
FIG. 6 is a hardware structure diagram illustrating a smart terminal provided in the disclosure.

As illustrated in FIG. 6, the embodiment of the disclosure, also provides a smart terminal 600. The smart terminal 600 includes, but is not limited to, a smart phone, a smart watch, a tablet, a personal computer, a laptop or a computer group. As illustrated in FIG. 6, the smart terminal 600 includes a processor 601, a memory 602, a transceiver 603 and a bus 606. The transceiver 603 is used to transmit data to external equipment and receive data from external equipment. There may be one or more processors 601 in the terminal 300. In some embodiments of the present application, the processor 601, the memory 602 and the transceiver 603 may be connected through a bus system or in other manners. The smart terminal 600 may be used to execute the method as illustrated in FIG. 1, FIG. 2, FIG. 3 and FIG. 4. For the meanings and examples of terms involved in the present embodiment, descriptions corresponding to FIG. 1, FIG. 2, FIG. 3, and FIG. 4 may be referred to, and will not be elaborated herein.

Herein, the memory 602 stores program codes. The processor 601 is used to call the program codes stored in the memory 602 for performing the operations at the blocks as illustrated in FIG. 1, FIG. 2, FIG. 3 and FIG. 4.

It is to be noted that the processor 601 here may be a processing element or may be a general term of multiple processing elements. For example, the processing element may be a Central Processing Unit (CPU) or an ASIC, or may be configured as one or more integrated circuit, such as one or more DSPs or one or more FPGA, for implementing the embodiments of the present disclosures.

The memory 602 may be a storage device or may be a collective of multiple storage elements, and is used to store, executable program codes or parameters, data and the like needed for running an application program an the device. Moreover, the memory 603 may include a Random Access Memory (RAM) or may include a non-volatile memory such as a disk memory or a flash.

The bus 606 may be an Industry Standard Architecture (ISA) bus, a Peripheral Component Interconnect (PCI) bus or an Extended Industry Standard Architecture (EISA) bus. The bus may be divided into an address bus, a data bus, a control bus and the like. For convenience of expression, in FIG. 6, the bus is represented by using only one thick line, but it doesn't mean that there is only one bus or buses of one type.

The terminal may further include an input/output device, connected to the bus 606, such that the input/output device can be connected to other parts such as the processor 601 through the bus. The input/output device may provide an input interface for an operator, such that the operator may select a control option through the input interface. The input/output device may also be another interface through which other equipment is externally connected.

Those skilled in the art can clearly know that for purpose of convenience and conciseness of description, for specific working processes of the system, the device and the units described above, the corresponding processes in the abovementioned method embodiment may be referred to, and will not be elaborated herein.

In some embodiments provided by the present application, it is to be understood that the disclosed system, device and method may be implemented in another manner. The device embodiments described above are only illustrative. For example, division of the units is only logic function division, and other division manners may be adopted during practical implementation. For another example, multiple units or components may be combined or integrated into another system, or some characteristics may be omitted or not executed. In addition, coupling or direct coupling or communication connection between the components as displayed or discussed may be indirect coupling or communication connection, implemented through some communication interfaces, of the device or the units, and may be electrical, or mechanical or adopt other forms.

The above-mentioned units described as separate parts may or may not be physically separated, and parts shown as units may or may not be physical units, and namely may be located in the same place, or may also be distributed to multiple networked units. Part or all of the units may be selected to achieve the purpose of the solutions of the present embodiment according to a practical requirement.

In addition, various function units in various embodiments of the disclosure may be integrated into a processing unit, or exist independently, and two or more units may also be integrated into a unit.

When being implemented in a form of software function unit and sold or used as an independent product, the function unit may also be stored in a computer-readable storage medium. Based on such an understanding, a substantial part of the disclosed technical solution or the part making contributions to the conventional art or a part of the technical solution may be embodied in form of software product, and the computer software product is stored in a storage medium. The storage medium includes a plurality of instructions for enabling computer equipment (which may be a personal computer, a server, network equipment or the like) to execute all or part of the steps of the method in various embodiments of the disclosure. The abovementioned storage medium includes: various medium, such as a U disk, a mobile hard disk, a Read-Only Memory (ROM), an RAM, a magnetic disk or an optical disk, capable of storing program codes.

Finally, it is to be noted that the various embodiments are merely intended to illustrate the technical solutions of the disclosure and does not limit the technical solutions. Though the disclosure is illustrated in detail with reference to each of the above embodiments, those skilled in the art shall understand that they can modify the technical solutions recorded in each of the above embodiments or can equivalently replace some or all of the technical features. These modifications or replacements do not make the essences of corresponding technical solutions depart from the scope of the technical solutions in each embodiment of the disclosure, and shall fall within the scope of the claims and specification of the disclosure.

The invention claimed is:

1. A method for enabling a terminal access to a cell, comprising:
   when performing a Circuit Switched Domain Fallback (CSFB) service, sending, by a terminal, a location update request to a base station of a first cell;
   when the terminal receives a location update reject message, which is returned by the base station of the first cell in response to the location update request, and the terminal determines that a reason for reject is Location Area Not Allowed according to the location update reject message, putting a Location Area Identification (LAI) of the first cell into a forbidden location areas (LAs) for roaming list, and setting a time period during which the first cell is held in the forbidden LAs for roaming list; and
   in response to putting the LAI of the first cell into the forbidden LAs for roaming list, searching, by the terminal, one or more second cells except the first cell, and performing an access operation within the time period.

2. The method according to claim 1, further comprising:
   after the time period, deleting, by the terminal, the first cell from the forbidden LAs for roaming list.

3. The method according to claim 1, further comprising:
   carrying, by the terminal, the LAI of the first cell in a broadcast message for broadcasting, the broadcast message comprising an indication identifier for indicating that the LAI of the first cell is held in the forbidden LAs for roaming list.

4. The method according to claim 3, wherein
   carrying, by the terminal, the indication identifier in a field of a head of the broadcast message.

5. A terminal, comprising:
   a processor; and
   a memory, configured to store instructions that are executable by the processor, wherein
   the processor is configured to:
   send, when performing a Circuit Switched Domain Fallback (CSFB) service, a location update request to a base station of a first cell;
   receive a location update reject message, which is returned by the base station of the first cell in response to the location update request;
   put, when determining that a reason for reject is Location Area Not Allowed according to the location update reject message, a Location Area Identification (LAI) of the first cell into a forbidden location areas (LAs) for roaming list, and set a time period during which the first cell is held in the forbidden LAs for roaming list; and
   search, in response to putting the LAI of the first cell into the forbidden LAs for roaming list, one or more second cells except the first cell, and perform an access operation within the time period.

6. The terminal according to claim 5, wherein the processor is further configured to:
   delete, after the time period, the first cell from the forbidden LAs for roaming list.

7. The terminal according to claim 5, wherein the processor is further configured to:
   carry the LAI of the first cell in a broadcast message for broadcasting, the broadcast message comprising an indication identifier for indicating that the LAI of the first cell is held in the forbidden LAs for roaming list.

8. The terminal according to claim 7, wherein the processor is further configured to: carry the indication identifier in a field of a head of the broadcast message.

9. A non-transitory computer-readable storage medium having stored thereon instructions that, when executed by a processor, cause the processor to execute a method for enabling a terminal access to a cell, the method comprising:
  when performing a Circuit Switched Domain Fallback (CSFB) service, sending, by a terminal, a location update request to a base station of a first cell;
  when the terminal receives a location update reject message, which is returned by the base station of the first cell in response to the location update request, and the terminal determines that a reason for reject is Location Area Not Allowed according to the location update reject message, putting a Location Area Identification (LAI) of the first cell into a forbidden location areas (LAs) for roaming list, and setting a time period during which the first cell is held in the forbidden LAs for roaming list; and
  in response to putting the LAI of the first cell into the forbidden LAs for roaming list, searching, by the terminal, one or more second cells except the first cell, and performing an access operation within the time period.

10. The non-transitory computer-readable storage medium according to claim 9, wherein the method further comprises:
  after the time period, deleting, by the terminal, the first cell from the forbidden LAs for roaming list.

11. The non-transitory computer-readable storage medium according to claim 9, wherein the method further comprises:
  carrying, by the terminal, the LAI of the first cell in a broadcast message for broadcasting, the broadcast message comprising an indication identifier for indicating that the LAI of the first cell is held in the forbidden LAs for roaming list.

12. The non-transitory computer-readable storage medium according to claim 11, wherein the method further comprises:
  carrying, by the terminal, the indication identifier in a field of a head of the broadcast message.

* * * * *